Figure 1:
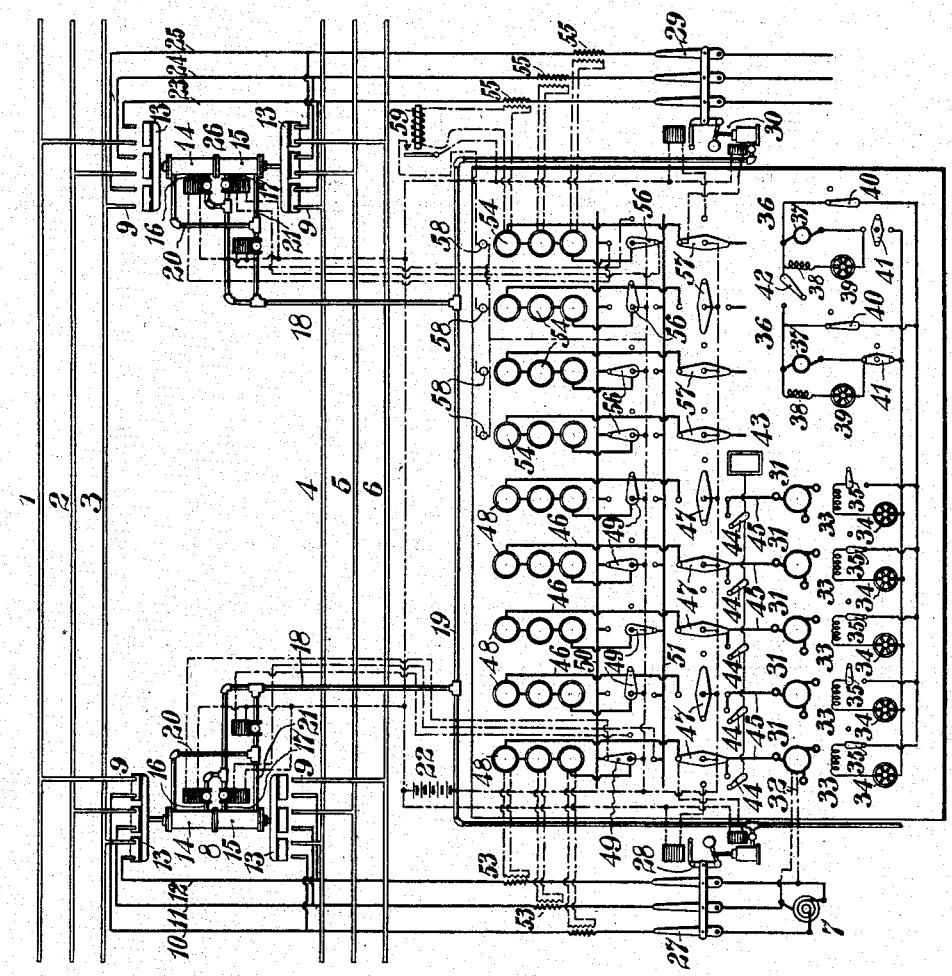

No. 675,532. Patented June 4, 1901.
L. B. STILLWELL.
SYSTEM OF ELECTRICAL DISTRIBUTION.
(Application filed Feb. 14, 1901.)

(No Model.) 2 Sheets—Sheet 1.

WITNESSES:
C. L. Belcher
Birney Hines

INVENTOR
Lewis B. Stillwell
BY
Shelby J. Carr
ATTORNEY.

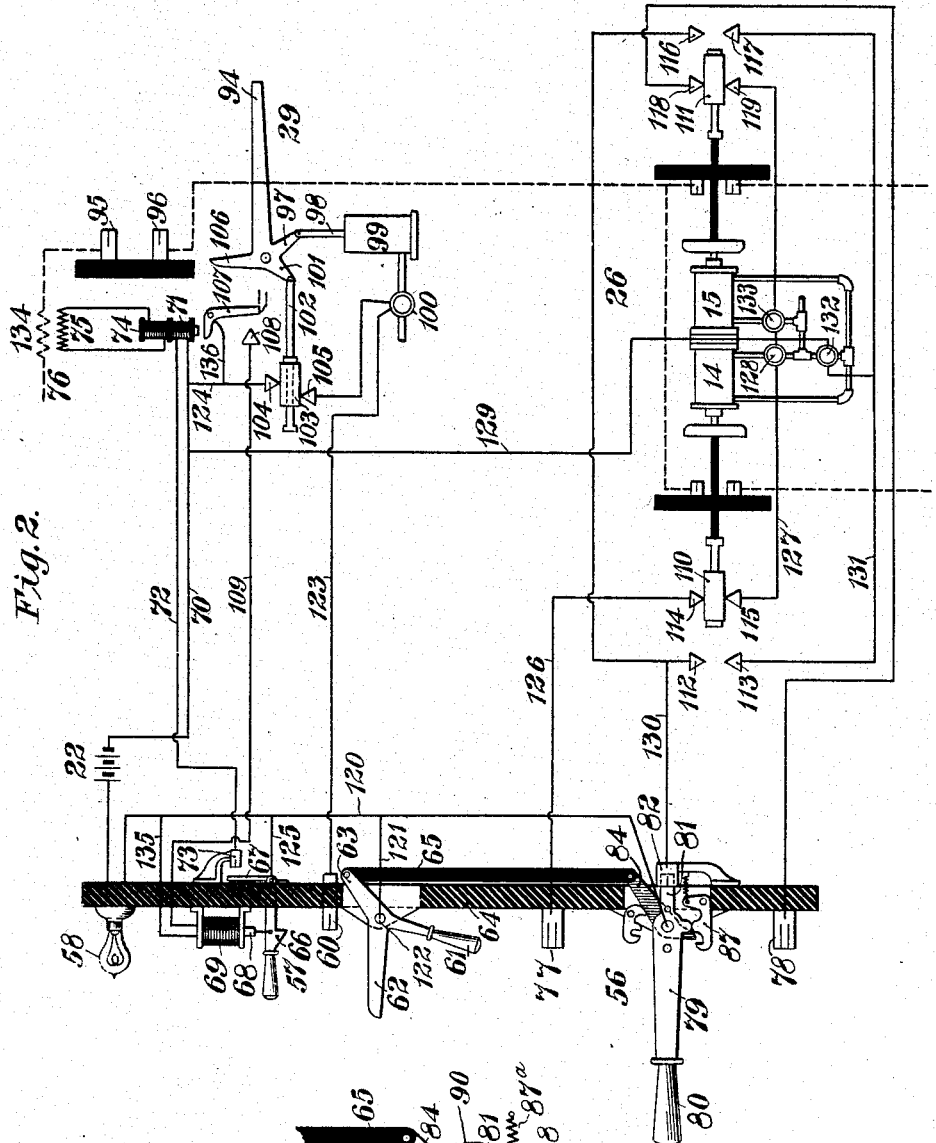

UNITED STATES PATENT OFFICE.

LEWIS B. STILLWELL, OF NEW YORK, N. Y.

SYSTEM OF ELECTRICAL DISTRIBUTION.

SPECIFICATION forming part of Letters Patent No. 675,532, dated June 4, 1901.

Application filed February 14, 1901. Serial No. 47,334. (No model.)

*To all whom it may concern:*

Be it known that I, LEWIS B. STILLWELL, a citizen of the United States, residing at New York, in the county of New York and State of New York, have invented a new and useful Improvement in Systems of Electrical Distribution, of which the following is a specification.

My invention relates to systems of electrical distribution, and more particularly to circuit-controlling apparatus and devices which are ordinarily collectively designated as "switchboards."

The object of my invention is to provide a means for locally representing the devices which are embodied in the main-switchboard apparatus and the manipulation of which will effect a corresponding operation of the main-switchboard apparatus and at the same time indicate to the operator the condition and circuit connections of the several devices which are comprised in the main system.

It has been the practice heretofore in certain large installations where great amounts of energy have been generated, transmitted, and utilized, and where a considerable number of large generator units have been employed, to operate the circuit-controlling devices from a distance by means of transmitted power, such as that of compressed air, and it is to such systems that my present invention is specially applicable.

In the operation of circuit-controlling devices located at a more or less distant point from the engineer or attendant in charge it is important that the devices shall be certain in operation and that the position of each of such devices shall be known to the engineer or attendant in order that the system may operate as a whole and in each of its parts with a maximum degree of efficiency and safety. In order to accomplish these ends, I have devised the means shown in the accompanying drawings, in which—

Figure 1 is a diagram of a portion of the main switchboard and apparatus of a generating and distributing system and a pilot-switchboard on which are represented in miniature various devices constituting the main switchboard and structure and the principal machines controlled thereby. Fig. 2 is a side elevation, partially diagrammatic and partially in section, of a portion of the main-switchboard apparatus and the pilot-switchboard; and Fig. 3 is a detail view of a portion of the pilot-switchboard mechanism.

Referring now particularly to Fig. 1, 1, 2, and 3 constitute one set of bus-bars for a three-phase system of distribution, and 4, 5, and 6 another similar set of bus-bars for such system. These bus-bars are supplied with energy from any desired number of three-phase generators, only one of such generators, 7, being shown, however, in the drawing. This generator is connected to the bus-bars 1, 2, and 3 by means of a selector-switch 8, the stationary members 9 of which are respectively connected to the conductors 10, 11, and 12, leading from the generator 7, and to the bus-bars 1, 2, and 3 at one end and to the generator-conductors and the bus-bars 4, 5, and 6 at the other end. The movable switch members 13 are shown as operated by means of compressed air, the inner ends of two cylinders 14 and 15 being supplied, respectively, through branch pipes 16 and 17, connected to a pipe 18, which connects with piping 19, that leads to a suitable air-compressor. (Not shown.) The outer ends of the cylinders 14 and 15 are supplied through pipes 20 and 21. The valves in pipes 16 and 17 and in the pipe leading to pipes 20 and 21 are controlled by electromagnets, the current for energizing which is supplied by a battery 22. Each generator of the system is connected to or disconnected from the two sets of bus-bars by a switch like that just described. The energy is supplied to feeders from either of the two sets of bus-bars by as many switches like that just described as there are sets of feeders, only one set of three-phase feeders 23, 24, and 25 and one switch 26 being, however, shown in the drawing. The switch 26 and its operating mechanism are the same as the corresponding parts employed in connection with the generator-conductors, and since the same reference-numerals are employed a repetition of the description already given is unnecessary.

Each set of generator-conductors is provided with a circuit-breaker 27, which may be automatically tripped in the usual manner and which may also be tripped and set by the attendant by a means 28, to be hereinafter described. Each of the sets of feeder-circuits is also provided with a circuit-breaker 29, which is tripped either automatically or at the will of the attendant and which may be set by a means 30, similar to that employed in connection with the generator-circuit breaker.

Referring now particularly to the pilot-switchboard, five generator-armatures 31 are indicated on the face of the board, these being represented as of the three-phase type, though for clearness of illustration conductors for only one of the phases are illustrated. The conductors for the other phases, if shown, would be the same as those illustrated and need not therefore be either shown or specifically described. These representations of generator-armatures may take the form of voltmeters or lamps or any other suitable devices that will give indication that the corresponding main generators 7 of the system are in service. In order to give this indication, each of these symbols is electrically connected to the corresponding main generator, the connection of one of the symbols 31 to the generator 7 being indicated at 32 in the drawings. The other symbols will in practice be similarly connected to the corresponding generators.

The field-magnet windings of the main generators are represented at 33, and the regulating-rheostats at 34. The switches 35 for the field-magnet circuits may, in general, be the only portions of the field-magnet-circuit symbols which give indications of electrical conditions in the main system. As indicated, when these switches are in the vertical position the main circuits are closed and when in the horizontal position the corresponding circuits are open. These field-magnet circuits are shown as supplied with energy from either or both of two exciters 36, the armatures, field-magnets, and rheostats of which are represented, respectively, at 37, 38, and 39. These representative exciter-circuits are also, respectively, provided with a controlling-switch 40 and a controlling circuit-breaker 41, and the two are also connected by a controlling-switch 42. As in the representation of the field-magnet circuits of the main generators, the only parts of the exciter-circuit symbols that need be employed for controlling the main-switchboard apparatus are the switches 40 and circuit-breakers 41. The pilot-switchboard may also be provided with a synchronizing indicator 43, which may be connected to and disconnected from the several armature-circuits by means of switches 44. Each generator-armature symbol 31 is represented as connected by conductors 45 and 46 and a circuit-breaker 47 to the upper one of a set of three ammeters 48, the ammeters of each set being connected together and the lower one being also connected to a switch 49, which when in vertical position makes connection with the one or the other of the two bus-bars 50 and 51. When the switch is in a horizontal position, the corresponding circuit is open. It will be seen that each of the ammeters is connected by means of conductors 52 to the secondary of a series transformer 53, the primary of which is in the corresponding leg of the main generator-circuit. Only one of the sets of ammeters is shown as connected electrically to the generator-circuit, it being understood that the other sets will, in practice, be similarly connected to the conductors leading from the corresponding generators. The pilot-switchboard here illustrated is arranged for use in connection with a system in which there are five main generators and four sets of feeders, the four sets of ammeters 54 at the right being connected to the corresponding feeder-circuits 23, 24, and 25 by means of series transformers 55, so as to indicate the current therein. The switch-symbols 56 and circuit-breaker symbols 57, which are indicated in connection with the feeder-circuits, are constructed and arranged the same as those employed in connection with the generator-circuits.

In connection with each feeder-circuit I provide the pilot-switchboard with a signal-lamp 58, which is lighted by current from the battery 22, when the corresponding feeder-circuit is energized, by reason of the action of a magnet 59, located in one of the circuits leading from a transformer 55 to the corresponding ammeter 54. The lamp thus serves to indicate to the attendant when the feeder-circuit is in and out of service.

It will be seen that the operation of the several symbol circuit-breakers and switches on the pilot-board will serve by closing and opening the corresponding battery-circuit branches to effect the operation of the main switches and the circuit-breakers in accordance with such manipulation. It will also be seen that the positions of the several symbol-switches and circuit-breakers on the pilot-board serve to indicate to the attendant the positions of the corresponding devices pertaining to the main switchboard and that the signal-lamps will always serve to indicate when the current is flowing through the feeder-circuits.

The conductors, which are represented by broken and dotted lines, will not be located upon the face of the pilot-board, but are necessarily indicated as so located in order that the various operating and controlling circuits may be shown. The bus-bars 50 and 51 and the conductors 45 and 46 may not be employed to convey current and ordinarily will not be so employed, but they are located on the face of the pilot-board in order to afford a complete representation of the several parts of the main switchboard.

The structural features and their operation may be more clearly understood by reference to Figs. 2 and 3 of the drawings, where are indicated a feeder-circuit breaker 29 and a selector-switch 26, pertaining to the main switchboard, and also the corresponding symbols 57 and 56 on the pilot-switchboard, though the parts here shown are represented as having operative form and proportions as distinguished from the diagrammatic representations of Fig. 1. The parts are here designated by the same reference-numerals as in Fig. 1, since they are intended to operate in the same way and effect the same results and, in fact, to be the same devices. The circuit-breaker and selector-switch of the main switchboard and the corresponding parts on the pilot-board may obviously be of different construction from that here shown. Hence it will be understood that the details so far as represented are intended merely to present operative means for carrying out my invention without in any way limiting the invention to such details.

The circuit-breaker 57 of the pilot-switchboard comprises a stationary contact-terminal 60 and a movable member consisting of a handle 61, a contact-blade 62, and an arm 63, the latter of which projects through an opening in the supporting plate or slab 64 and is connected to the upper end of a link 65, preferably of insulating material. The free end of the blade 62 when the circuit-breaker is closed is engaged by a hook on a pivoted latch 66, which, at the inner side of the board, is provided with an upwardly-projecting circuit-closing arm or member 67. The latch 66 is connected to an armature or solenoid-core 68, the actuating-coil 69 of which is mounted upon the front of the board 64. Above the coil 69 is a signal-lamp 58, which is connected to one terminal of the battery 22. The other terminal of the battery is connected by means of conductor 70 to one terminal of a solenoid or magnet coil 71, the other terminal of said coil being connected by a conductor 72 to a contact-terminal 73, adjacent to the arm 67 on the circuit-breaker latch 66. Just above the solenoid or magnet-coil 71 is another solenoid or magnet-coil 74, the terminals of which are respectively connected to the terminals of the secondary 75 of a series transformer 76, the primary of which is in one leg of the feeder-circuit. The pilot-switch 56 comprises two switch-jaws or contact-terminals 77 and 78 and a pivoted blade 79, having a handle 80 and provided with an inwardly-projecting contact end 81, that engages with a contact jaw or terminal 82 when the switch-blade is in the neutral or open position, as indicated in the drawings. Mounted upon a pivot 83, which supports the switch-blade, and so that the blade may move independently of it, is an arm 84, the inner end of which is connected to the lower end of the link 65. The other end 85 of the arm 84 constitutes a projection, which engages with a hook 86 on the end of a pivoted block 87 when the switch-blade is moved either upward or downward to or toward the circuit-closing position. The hook 86 is held out of engagement with the projecting arm 85 when the blade is in neutral or open position by means of a lug 88, projecting below the pivot 83. The switch-blade is also provided on one side of the pivot with a pin 90 and on the other side with a pin 89, the former of which engages a notch 91 in a pivoted locking-piece 92 when the switch-blade is thrown down and the latter with the notch 91 when the blade is thrown up to circuit-closing position. The main-circuit breaker 29 is shown as having a blade 94, that engages with two contact-terminals 95 and 96, interposed in the corresponding leg of the main circuit. The breaker also has an arm 97, that is pivoted to the stem 98 of a piston operating in a pneumatic cylinder 99, the admission of air to which is controlled by a magnetically-actuated valve 100. A second arm 101 is connected by means of a link 102 to a circuit making and breaking piece 103, that engages two contact-pieces 104 and 105. Another arm 106 constitutes a locking-arm to engage with a pivoted armature 107, which is located in such position as to be actuated by either of the solenoids or magnet-coils 71 and 74 to release the circuit-breaker when the current in either of said coils is sufficient. A stationary contact-piece 108 is connected by a conductor 109 to one terminal of the solenoid or magnet-coil 69 on the pilot-switchboard and is in position to be engaged by the armature 107 when it is attracted by either of its coils.

The selector-switch 26 comprises the several parts shown in Fig. 1 and already described, and it has also two movable circuit-closing members 110 and 111, actuated, respectively, by pistons (not shown) in cylinders 14 and 15 and coöperating, respectively, with stationary contact-terminals 112, 113, 114, and 115 and stationary contact-terminals 116, 117, 118, and 119. The various circuit connections between the portions of the apparatus above described will be specified in connection with the description of the operation of the invention and need not, therefore, be here designated except to the extent that they have been incidentally mentioned in describing the various parts of the apparatus to which they are connected.

The operation is as follows: If the handle 61 of the circuit-breaker on the pilot-board be thrown up until the latch 66 holds the end of the blade 62, a circuit is established from battery 22 through lamp 58, wires 120 and 121 to circuit-breaker fulcrum 122, through circuit-breaker blade 62, jaw 60, wire 123 to air-valve magnet 100, to terminal 105 through member 103, terminal 104, and wires 124 and 70 to battery. The current will open the air-valve at 100, and thus admit air to cylinder 99 to close the circuit-breaker. As the circuit-breaker nearly closes the contact-piece 105 will be moved from between the contact-terminals 104 and 105, thus opening the battery-circuit. The air-valve at 100 will close and the air-pressure be withdrawn from under the piston in cylinder 99. The circuit-breaker will be prevented from opening, however, by means of the engagement of the latch-armature 107 with the end of arm 106. If it is desired to test the circuit-breaker for opening, the handle of latch 66 on the pilot-board is raised, thus releasing the circuit-breaker blade 62 and permitting the same to fall. In raising latch 66 contact is also made between arm 67 and block 73, thus completing the circuit from battery 22 through lamp 58, wires 120 and 125 to arm 67, block 73 and wire 72 to magnet 71, and wire 70 to battery. The energized magnet 71 attracts armature 107, thus releasing arm 106 of the main-circuit breaker, which then falls to the open position and in falling pushes the member 103 between the contacts 104 and 105, thus closing the air-valve circuit at this point and restoring the conditions necessary to permit the circuit-breaker to be again closed, if desired. The above-specified movements complete the operation of "testing the circuit-breaker." To test the selector-switch 26, the handle 80 is thrown either up or down. If the handle be thrown up, the circuit will be closed from battery 22 through lamp 58, wire 120 to fulcrum 83 of switch 56, switch-blade 79, jaw 77, wire 126, contact 114, member 110, contact 115, wire 127, air-valve magnet 128, and wire 129 to battery. Air-valve at 128 admits air to the rear of cylinder 14, forcing its piston out, and thus closing switch. After the piston has moved nearly to its outer position the member 110 will be moved from between the contacts 114 and 115, thus permitting the closing of the air-valve at 128 and opening the rear end of the cylinder to the atmosphere. When the pilot-switch is closed, in testing it is highly desirable that the circuit-breaker should be prevented from being closed until the switch is opened. This is provided for as follows: When the switch-blade 79 is thrown up or down, the projection 88 is moved from engagement with the projection on the latch-lever 87, and thus permits the spring 87$^a$ to rock the latch 86 into engagement with the end 85 of lever 84. Since lever 84 is connected to the circuit-breaker arm 63 by the rod 65, it will be readily seen that no movement of the circuit-breaker can take place until the switch-blade 79 is moved to the central position to again throw down latch-lever 87. The selector-switch being closed and it being desired to open the same, switch-arm 79 is thrown to the open position, thus completing the circuit from battery 22 through lamp 58, wire 120, fulcrum 83, switch-blade projection 81, jaw 82, wire 130, contact 112, member 110, (which, it will be remembered, is now between contacts 112 and 113,) contact 113, wire 131, air-valve 132, and wire 129 to battery. Air-valve 132 admits air to front ends of both cylinders 14 and 15; but as the piston of cylinder 14 is out and the piston of cylinder 15 is in there will be movement of the piston in cylinder 14 only. This will open the main switch, the final movement of which will again return the member 110 to position between the contacts 114 and 115, so as to allow the switch to be again closed, if desired. If the pilot-switch had been thrown down instead of up, then the circuit would have been made through jaw 78 and the air-valve 133, thus closing the other side of the selector-switch. Both the opening and the closing of this switch will be understood from the foregoing explanation.

In actual working the circuit-breaker must be first closed, and then the selector-switch may be thrown up or down, as desired, in order that the circuit through the breaker may be connected through the selector-switch. It is important that the selector-switch shall not be opened when the circuit-breaker is in, and this is prevented as follows: When the circuit-breaker on the pilot-board is thrown in, the lever 84 is tilted by the connecting-rod 65, which moves downward. This permits the latch 92 to drop into such a position that either the pin 89 or the pin 90 will enter the notch 91 when the switch-blade 89 is moved to circuit-closing position. This prevents the switch-blade from being returned to its central position, and it will continue to be so prevented until such time as the latch 92 is raised by the opening of the pilot circuit-breaker, either manually or automatically.

The automatic method will now be explained. In one or more leads of the circuit controlled by this switch organization are placed series transformers 76, the primary of one being represented at 134. The secondary 75 is connected in series with the solenoid 74. The armature 107 may be so weighted that a certain current strength is necessary through primary 134 before the armature 107 can be lifted by solenoid 74. Thus an excessive current in the line will cause the armature 107 to release the circuit-breaker to open the circuit in which it is placed. When this takes place, it is necessary that the pilot circuit-breaker be also opened to inform the operator that such opening has occurred. This may be done as shown in the drawings. When armature 107 is moved by solenoid 74, it touches contact 108, thus closing the circuit from battery 22 through lamp 58, wire 135, coil 69, wire 109, contact 108, armature 107, and wires 136 and 70 to the battery, the coil 69 being thus energized to lift latch 66 and allow the pilot circuit-breaker to open.

It will be understood that my invention is not limited to any specific forms, types, or arrangements of switchboard apparatus or to any specific agent or agents for transmitting energy between the pilot-board and the main board, it being sufficient for the purposes of my invention that the pilot devices serve to control and indicate the operation of the main apparatus and possess suitable safety characteristics and elements.

I claim as my invention—

1. In a system of electrical distribution, the combination with a main switchboard having circuit-controlling devices, of means for operating said devices, a pilot-switchboard having devices which represent the main-switchboard devices, and controlling connections between said pilot-switchboard devices and the main operating means whereby the pilot devices control the operation of the main devices and also indicate the movements and positions thereof.

2. A main switchboard comprising circuit-controlling devices, in combination with a pilot-switchboard having devices which represent the controlling devices of the main switchboard and their circuit connections, and actuating connections between the main-switchboard devices and the corresponding pilot devices whereby the movements of the main-switchboard-controlling devices are governed by those of the pilot-switchboard and the latter indicate the connections and conditions of said main-switchboard devices.

3. A main switchboard having circuit-controlling devices, in combination with a pilot-switchboard having means for controlling the main-switchboard apparatus and indicating its movements and connections and having signal devices which are energized from the main switchboard in such manner as to indicate to the operator at the pilot-board the completion of the movements of the main-switchboard-controlling devices.

4. The combination with a main switchboard having circuit-controlling devices and a pilot-switchboard having devices which represent those of the main switchboard, of connections between the pilot-switchboard devices and the main-switchboard devices which are so arranged that when one of the main-switchboard devices changes its position and connections, either automatically or otherwise, the corresponding pilot-switchboard device is similarly changed in position and apparent connections.

5. A pilot-switchboard comprising representative devices or symbols corresponding to the circuit-controlling devices of a main system and so arranged, in combination with diagrammatic bus-bars and connections, as to convey to the eye an accurate representation of the connections existing in the main switchboard.

6. In a system of electrical distribution, the combination with the generating and circuit-controlling apparatus, of a pilot-switchboard having devices for governing the main-circuit-controlling apparatus and for indicating the condition and connections of both the generating apparatus and the circuit-controlling apparatus.

7. In a system of electrical distribution, the combination with circuit-controlling devices, of a pilot-switchboard having corresponding devices so arranged and connected with each other and with the main devices as to convey to the eye, at all times, a diagrammatic representation of the main devices and their circuit connections.

8. In a system of electrical distribution, the combination with a main switchboard having circuit-breakers and switches and means for operating them, of a pilot-switchboard having representative circuit-breakers and switches and controlling connections between the operating means for each main-circuit breaker and switch and its pilot-board representative, whereby each pilot-board device controls the corresponding main device and indicates its movements and condition.

9. In a system of electrical distribution, the combination with a main switchboard having circuit-breakers and switches, and a pilot-switchboard having representative circuit-breakers and switches and interlocking connections between them, of controlling connections between the main devices and the corresponding representative devices whereby the latter both control and represent the former.

In testimony whereof I have hereunto subscribed my name this 8th day of February, 1901.

LEWIS B. STILLWELL.

Witnesses:
W. E. RUNDLE,
M. L. T. STILLWELL.